US012726116B2

(12) United States Patent
Hayashi

(10) Patent No.: US 12,726,116 B2
(45) Date of Patent: Sep. 1, 2026

(54) POWER CONVERSION DEVICE

(71) Applicant: KABUSHIKI KAISHA TOSHIBA, Tokyo (JP)

(72) Inventor: Yusuke Hayashi, Yokohama Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 171 days.

(21) Appl. No.: 18/601,276

(22) Filed: Mar. 11, 2024

(65) Prior Publication Data

US 2024/0429814 A1 Dec. 26, 2024

(30) Foreign Application Priority Data

Jun. 20, 2023 (JP) ................................ 2023-101201

(51) Int. Cl.
*H02M 3/00* (2006.01)
*H02M 1/00* (2006.01)

(52) U.S. Cl.
CPC ......... *H02M 3/015* (2021.05); *H02M 1/0009* (2021.05); *H02M 1/0074* (2021.05)

(58) Field of Classification Search
CPC .. H02M 1/009; H02M 1/0006; H02M 1/0012; H02M 1/0016; H02M 1/0074; H02M 1/0077; H02M 1/008; H02M 1/0083; H02M 1/0085; H02M 1/0067; H02M 3/015; H02M 3/01; H02M 3/02
See application file for complete search history.

(56) References Cited

U.S. PATENT DOCUMENTS

| | | | |
|---|---|---|---|
| 7,405,495 | B2 | 7/2008 | Guillarme et al. |
| 10,128,756 | B2 | 11/2018 | Zhang et al. |
| 10,340,699 | B2 | 7/2019 | Uno et al. |
| 10,734,818 | B2 | 8/2020 | Uno et al. |

(Continued)

FOREIGN PATENT DOCUMENTS

| | | | |
|---|---|---|---|
| CN | 104167918 | B | 6/2017 |
| FR | 2835115 | B1 | 1/2022 |

(Continued)

OTHER PUBLICATIONS

Hayashi, et al., "Design consideration for high step-up non-isolated multicellular dc-dc converter for PV micro converters", Hindawi Publishing Corporation, Journal of Engineering, pp. 1-16, 2018, 17 pages.

(Continued)

*Primary Examiner* — Nguyen Tran
(74) *Attorney, Agent, or Firm* — Maier & Maier, PLLC

(57) ABSTRACT

According to one embodiment, a power conversion device includes a plurality of non-isolated DC-DC converter circuits each including a bidirectional element, wherein inputs of the plurality of non-isolated DC-DC converter circuits are connected in parallel, and outputs of the plurality of non-isolated DC-DC converter circuits are connected in series. According to another embodiment, a power conversion device includes a plurality of non-isolated DC-DC converter circuits each including a bidirectional element, wherein inputs of the plurality of non-isolated DC-DC converter circuits are connected in series, and outputs of the plurality of non-isolated DC-DC converter circuits are connected in parallel.

7 Claims, 10 Drawing Sheets

(56) References Cited

U.S. PATENT DOCUMENTS

| | | | | |
|---|---|---|---|---|
| 11,063,526 | B2 | 7/2021 | Hayashi | |
| 2006/0273770 | A1 * | 12/2006 | Siri | H02M 3/33515 323/272 |
| 2013/0193910 | A1 | 8/2013 | Kitamine | |
| 2015/0078045 | A1 * | 3/2015 | Zhang | H02M 7/068 363/64 |
| 2021/0021194 | A1 | 1/2021 | Finger et al. | |

FOREIGN PATENT DOCUMENTS

| | | | |
|---|---|---|---|
| FR | 2835116 | B1 | 1/2022 |
| JP | H7-264841 | A | 10/1995 |
| JP | H11178330 | A | 7/1999 |
| JP | 3324863 | B2 | 7/2002 |
| JP | 2004-007907 | A | 1/2004 |
| JP | 2005-528067 | A | 9/2005 |
| JP | 2005-333783 | A | 12/2005 |
| JP | 3973489 | B2 | 6/2007 |
| JP | 2008-072834 | A | 3/2008 |
| JP | 4138664 | B2 | 6/2008 |
| JP | 2009-027867 | A | 2/2009 |
| JP | 2009-303380 | | 12/2009 |
| JP | 4552015 | B2 | 9/2010 |
| JP | 2011-109910 | A | 6/2011 |
| JP | 2012217319 | A | 11/2012 |
| JP | 5122200 | B2 | 1/2013 |
| JP | 2013-121211 | A | 6/2013 |
| JP | 2013158224 | A | 8/2013 |
| JP | 5394357 | B2 | 10/2013 |
| JP | 2014-053992 | A | 3/2014 |
| JP | 2015-076528 | A | 4/2015 |
| JP | 5819172 | B2 | 11/2015 |
| JP | 2015-226356 | A | 12/2015 |
| JP | 6008365 | B2 | 10/2016 |
| JP | 2017-028864 | A | 2/2017 |
| JP | 2017-521041 | A | 7/2017 |
| JP | 6201182 | B2 | 9/2017 |
| JP | 6357709 | B2 | 6/2018 |
| JP | 2020-068559 | A | 4/2020 |
| JP | 2020-178391 | A | 10/2020 |
| JP | 2021-097532 | A | 6/2021 |
| JP | 2021-144502 | A | 9/2021 |
| WO | 2003/063327 | A2 | 7/2003 |
| WO | 2016/000489 | A1 | 1/2016 |
| WO | 2017/014300 | A1 | 1/2017 |

OTHER PUBLICATIONS

Hayashi, et al., "Fundamental study of high step-down non-isolated multicellular dc-dc converter for future dc distribution systems", Journal of Energy and Power Engineering (JEPE), vol. 11, No. 9, pp. 605-613, 2017, 9 pages.

Office Action issued on Jan. 16, 2026, in corresponding Japanese Application No. 2023-101201, 8 pages.

* cited by examiner

POWER CONVERSION DEVICE

CROSS REFERENCE TO RELATED APPLICATIONS

This application is based upon and claims the benefit of priority from the prior Japanese Patent Application No. 2023-101201, filed on Jun. 20, 2023, the entire contents of which are incorporated herein by reference.

FIELD

Embodiments described herein relate to a power conversion device.

BACKGROUND

There is known a power conversion device which raises or lowers a DC input voltage to output a fixed DC voltage. For example, a power conversion device using an LLC resonant converter circuit is known.

In the case of a power conversion device using an LLC resonant converter circuit, it is difficult for the LLC resonant converter circuit alone to perform control such that an output voltage is kept constant in a case where the output voltage ranges widely from a low output voltage to a high output voltage. For this reason, a constant-voltage circuit is generally provided upstream of an LLC resonant converter circuit, and it is common to perform constant-voltage control by the constant-voltage circuit at a first stage, and thereafter raise or lower a voltage by the LLC resonant converter circuit at a second stage.

DETAILED DESCRIPTION

Figure 1:
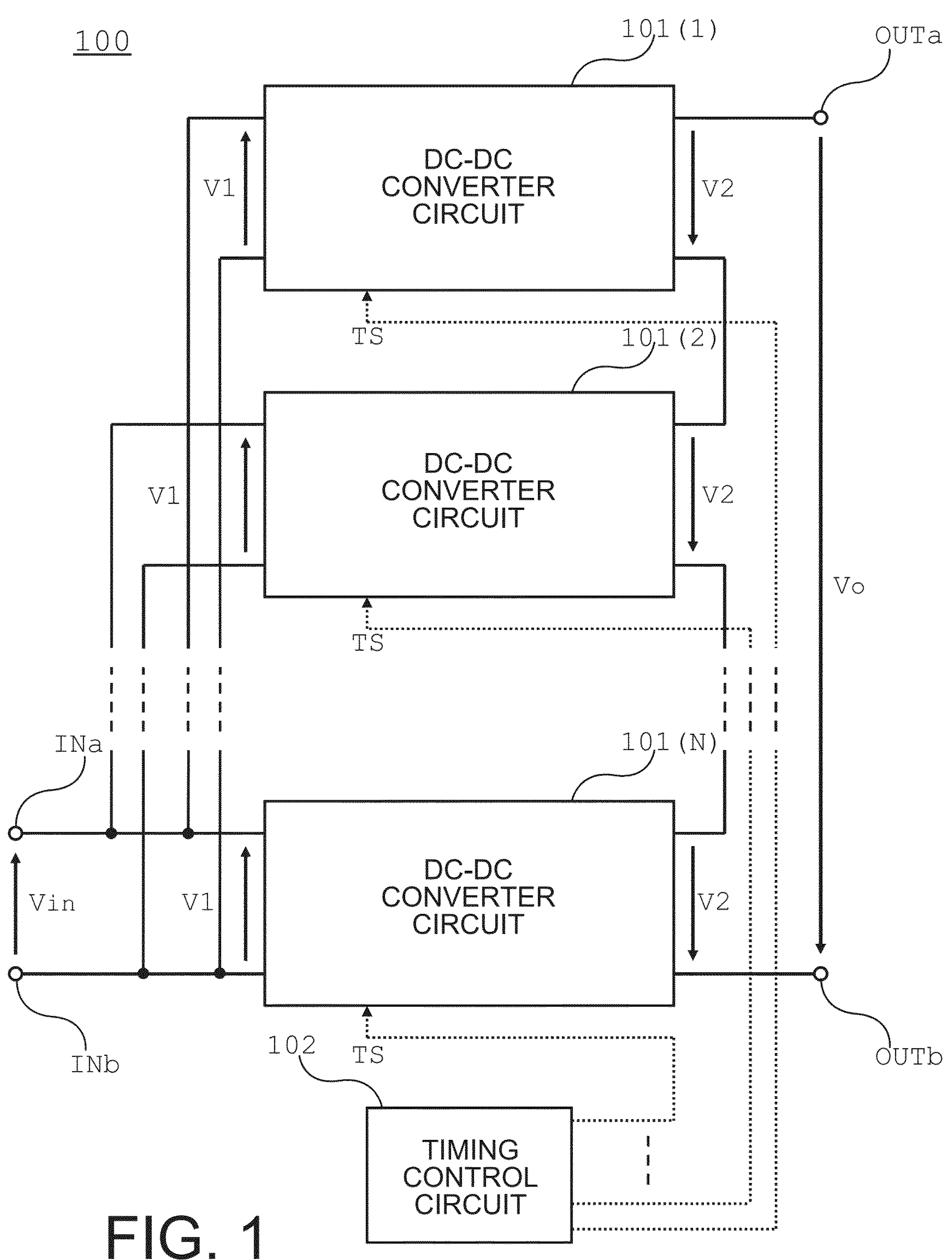
FIG. 1 is a diagram showing a configuration of a power conversion device according to a first embodiment.

According to one embodiment, a power conversion device includes a plurality of non-isolated DC-DC converter circuits each including a bidirectional element, wherein inputs of the plurality of non-isolated DC-DC converter circuits are connected in parallel, and outputs of the plurality of non-isolated DC-DC converter circuits are connected in series.

According to another embodiment, a power conversion device includes a plurality of non-isolated DC-DC converter circuits each including a bidirectional element, wherein inputs of the plurality of non-isolated DC-DC converter circuits are connected in series, and outputs of the plurality of non-isolated DC-DC converter circuits are connected in parallel.

Embodiments of the present invention will be described below with reference to the drawings. Identical or corresponding elements are denoted by same reference characters in the drawings, and a detailed description thereof will be appropriately omitted.

First Embodiment

FIG. 1 is a diagram showing a configuration of a power conversion device 100 according to a first embodiment. The power conversion device 100 is a device which raises a DC input voltage to output a fixed DC voltage, and includes input terminals INa and INb and output terminals OUTa and OUTb. A DC input voltage “Vin” is applied to the input terminals INa and INb, and a DC output voltage “Vo” (>Vin) is output from the output terminals OUTa and OUTb.

The power conversion device 100 includes N non-isolated DC-DC converter circuits 101(1) to 101(N) and a timing control circuit 102 which controls operation timings of the N DC-DC converter circuits 101(1) to 101(N). Inputs of each of the DC-DC converter circuits 101(1) to 101(N) are connected in parallel, one is connected to the input terminal INa, and the other is connected to the input terminal INb. Input voltages “V1” of the DC-DC converter circuits 101(1) to 101(N) are all equal, and V1=Vin.

Outputs of each of the DC-DC converter circuits 101(1) to 101(N) are connected in series, one output of the DC-DC converter circuit 101(1) at a top stage is connected to the output terminal OUTa, and the other output of the DC-DC converter circuit 101(N) at a bottom stage is connected to the output terminal OUTb. Output voltages “V2” of the DC-DC converter circuits 101(1) to 101(N) are all equal, and V2×N=Vo.

Figure 2:
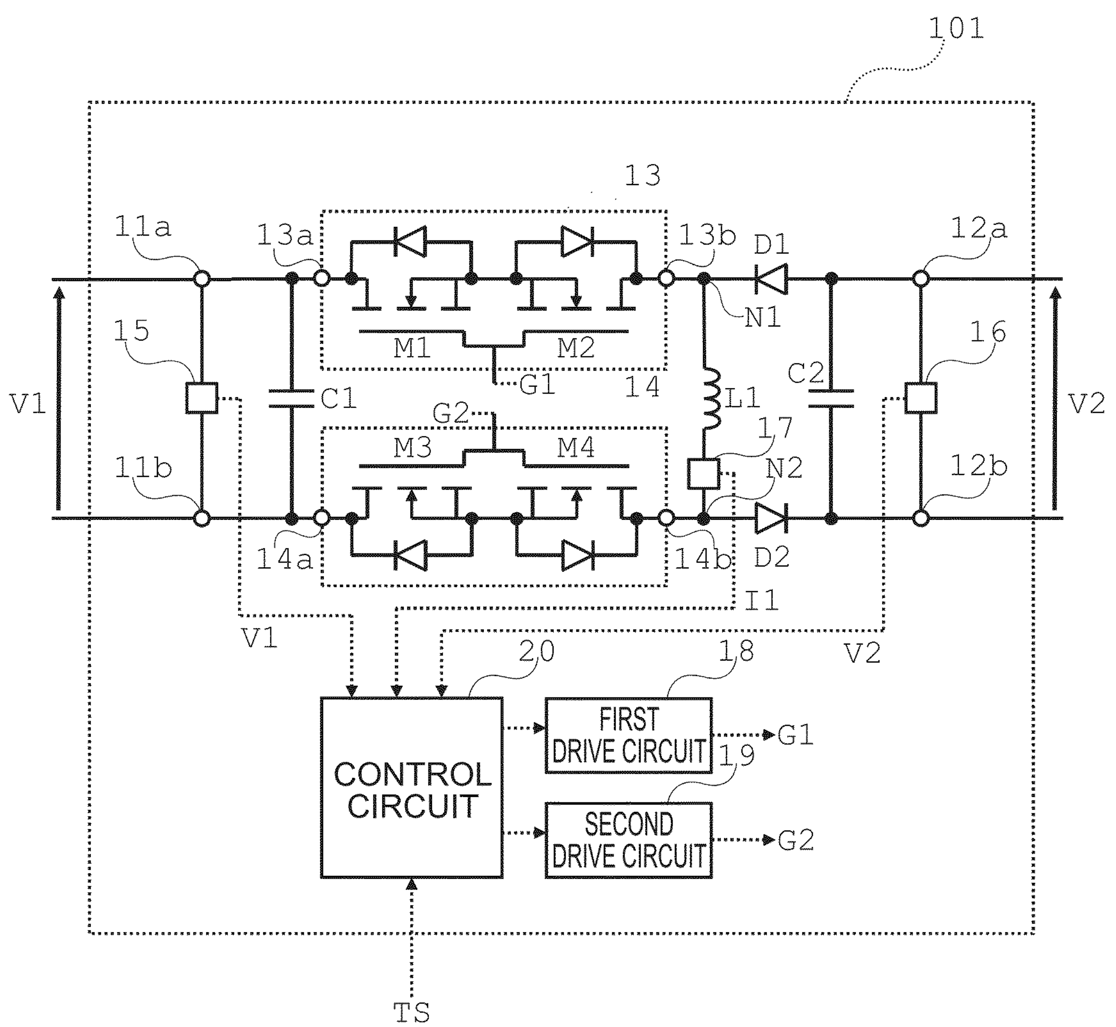
FIG. 2 is a diagram showing a detailed configuration of a non-isolated DC-DC converter circuit according to the first embodiment.

FIG. 2 is a diagram showing a detailed configuration of a non-isolated DC-DC converter circuit 101 according to the present first embodiment. Note that configurations of the DC-DC converter circuits 101(1) to 101(N) are all identical and that the DC-DC converter circuits 101(1) to 101(N) are collectively denoted as the DC-DC converter circuits 101.

The DC-DC converter circuit 101 includes a first input terminal 11*a* and a second input terminal 11*b*, a first output terminal 12*a* and a second output terminal 12*b*, a first bidirectional element 13 which is provided between the first input terminal 11*a* and the first output terminal 12*a*, and a second bidirectional element 14 which is provided between the second input terminal 11*b* and the second output terminal 12*b*.

The first bidirectional element 13 includes semiconductor switching elements M1 and M2. As each of the semiconductor switching elements M1 and M2, for example, an N-channel MOSFET (Metal Oxide Semiconductor Field Effect Transistor) can be used. In this case, source terminals of the semiconductor switching elements M1 and M2 are connected together, and gate terminals thereof are connected together. A drain terminal of the semiconductor switching element M1 is connected to one terminal 13*a* of the first bidirectional element 13, and a drain terminal of the semiconductor switching element M2 is connected to the other terminal 13*b* of the first bidirectional element 13.

If a control signal G1 which is supplied to the first bidirectional element 13 is ON, the first bidirectional element 13 is conducting in both directions. That is, a current can flow in a rightward direction in FIG. 2 via a drain-to-source channel of the semiconductor switching element M1 and a parasitic diode of the semiconductor switching element M2, and a current can also flow in a leftward direction in FIG. 2 via a drain-to-source channel of the semiconductor switching element M2 and a parasitic diode of the semiconductor switching element M1.

If the control signal G1 supplied to the first bidirectional element 13 is OFF, a current does not flow in either direction of the first bidirectional element 13. That is, a potential at the one terminal 13*a* of the first bidirectional element 13 and a potential at the other terminal 13*b* are electrically separated.

The second bidirectional element 14 includes semiconductor switching elements M3 and M4. As each of the semiconductor switching elements M3 and M4, for example, an N-channel MOSFET can be used. In this case, source terminals of the semiconductor switching elements M3 and M4 are connected together, and gate terminals thereof are connected together. A drain terminal of the semiconductor switching element M3 is connected to one terminal 14*a* of the second bidirectional element 14, and a drain terminal of the semiconductor switching element M4 is connected to the other terminal 14*b* of the second bidirectional element 14.

If a control signal G2 which is supplied to the second bidirectional element 14 is ON, the second bidirectional element 14 is conducting in the two directions. That is, a current can flow in the rightward direction in FIG. 2 via a drain-to-source channel of the semiconductor switching element M3 and a parasitic diode of the semiconductor switching element M4, and a current can also flow in the leftward direction in FIG. 2 via a drain-to-source channel of the semiconductor switching element M4 and a parasitic diode of the semiconductor switching element M3.

If the control signal G2 supplied to the second bidirectional element 14 is OFF, a current does not flow in either direction of the second bidirectional element 14. That is, a potential at the one terminal 14*a* of the second bidirectional element 14 and a potential at the other terminal 14*b* are electrically separated.

The DC-DC converter circuit 101 also includes a first inductor L1, a first unidirectional element D1, and a second unidirectional element D2. One end of the first inductor L1 is connected to a first node N1 between the first bidirectional element 13 and the first output terminal 12*a*, and the other end of the first inductor L1 is connected to a second node N2 between the second bidirectional element 14 and the second output terminal 12*b*.

As the first unidirectional element D1, for example, a semiconductor diode can be used. In this case, an anode of the first unidirectional element D1 is connected to the first output terminal 12*a*, and a cathode of the first unidirectional element D1 is connected to the first node N1.

As the second unidirectional element D2, for example, a semiconductor diode can be used. In this case, an anode of the second unidirectional element D2 is connected to the second node N2, and a cathode of the second unidirectional element D2 is connected to the second output terminal 12*b*.

The DC-DC converter circuit 101 also includes a first capacitor C1 and a second capacitor C2. The first capacitor C1 is connected between the first input terminal 11*a* and the second input terminal 11*b*. The second capacitor C2 is connected between the first output terminal 12*a* and the second output terminal 12*b*.

The DC-DC converter circuit 101 further includes a first voltage sensor 15, a second voltage sensor 16, a first current sensor 17, a first drive circuit 18, a second drive circuit 19, and a control circuit 20.

The first voltage sensor 15 detects the input voltage "V1" (a first voltage) of the DC-DC converter circuit 101. The second voltage sensor 16 detects the output voltage "V2" (a second voltage) of the DC-DC converter circuit 101. The first current sensor 17 detects a first current "I1" which flows through the first inductor L1.

The first drive circuit 18 supplies the first PWM control signal G1 to the first bidirectional element 13. The second drive circuit 19 supplies the second PWM control signal G2 to the second bidirectional element 14. The control circuit 20 controls operation of the first drive circuit 18 and the second drive circuit 19 on the basis of a timing control signal TS which is input from the timing control circuit 102, the input voltage "V1" and the output voltage "V2," and the first current "I1."

Figure 3:
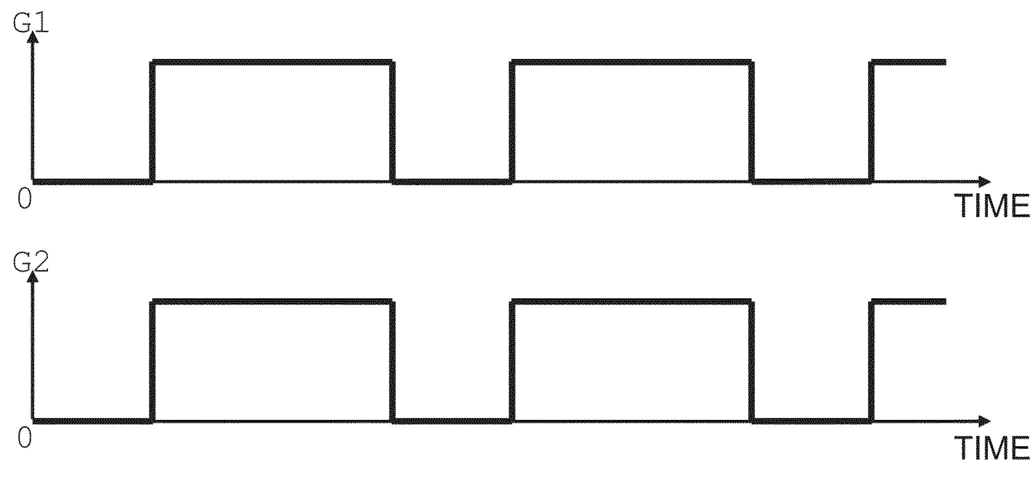
FIG. 3 is a chart showing one example of a temporal waveform of each of a first PWM control signal and a second PWM control signal according to the first embodiment.

FIG. 3 is a chart showing one example of a temporal waveform of each of the first PWM control signal G1 and the second PWM control signal G2. The first PWM control signal G1 and the second PWM control signal G2 are controlled so as to have identical waveforms which change with identical timings. That is, the second PWM control signal G2 turns ON at a timing when the first PWM control signal G1 turns ON, and the second PWM control signal G2 turns OFF at a timing when the first PWM control signal G1 turns OFF. Note that a voltage level of the first PWM control signal G1 and a voltage level of the second PWM control signal G2 are different, and GNDs for the both signals are separated.

When the first PWM control signal G1 and the second PWM control signal G2 both turn ON, the first bidirectional element 13 and the second bidirectional element 14 both come into conduction. At this time, a current flows through a path from the first input terminal 11*a* through the first bidirectional element 13, the first inductor L1, and the second bidirectional element 14 to the second input terminal 11*b*, and magnetic energy is accumulated in the first inductor L1 due to the current.

When the first PWM control signal G1 and the second PWM control signal G2 both turn OFF, the first bidirectional element 13 and the second bidirectional element 14 both come out of conduction. At this time, a current flows through a path from the first inductor L1 through the second unidirectional element D2, the second output terminal 12*b*, and the first output terminal 12*a* to the first unidirectional element D1 due to the magnetic energy accumulated in the first inductor L1.

The control circuit 20 can perform control such that the output voltage "V2" of the DC-DC converter circuit 101 is kept constant, by appropriately adjusting duty ratios "D" ($0<D<1$) of the first PWM control signal G1 and the second PWM control signal G2.

For example, if the input voltage "V1"<the output voltage "V2," the DC-DC converter circuit 101 functions as a step-up converter circuit. For example, if the input voltage "V1">the output voltage "V2," the DC-DC converter circuit 101 functions as a step-down converter circuit.

Figure 4:
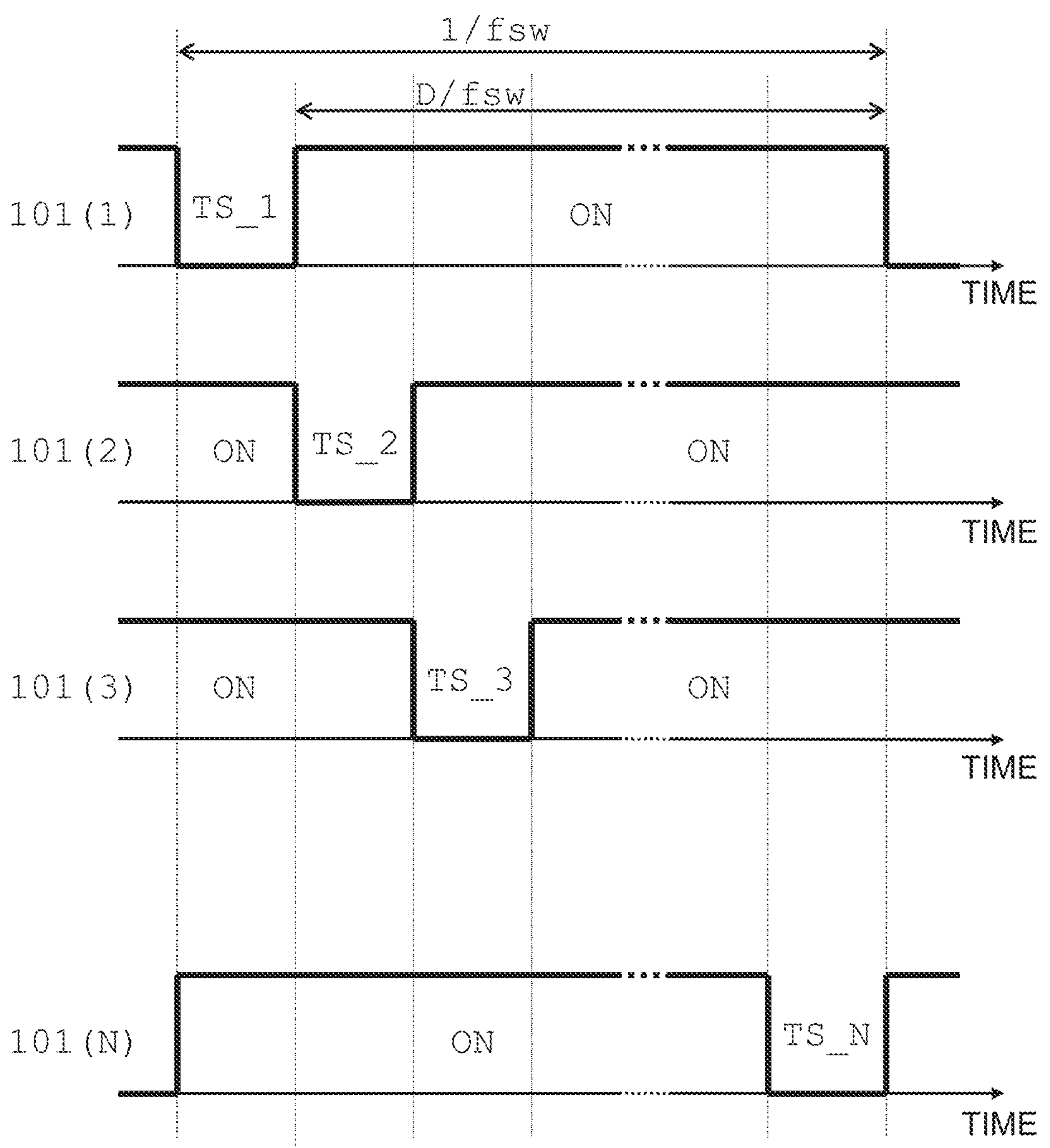
FIG. 4 is a chart showing respective ON/OFF operation timings of N non-isolated DC-DC converter circuits according to the first embodiment.

FIG. 4 is a chart showing respective ON/OFF operation timings of the N non-isolated DC-DC converter circuits 101(1) to 101(N) according to the present first embodiment. The timing control circuit 102 controls operation of the N DC-DC converter circuits 101(1) to 101(N) by repeating N time slots TS_1 to TS_N. Note that "fsw" represents a switching frequency in FIG. 4.

In the first time slot TS_1, only the first bidirectional element 13 and the second bidirectional element 14 of the first DC-DC converter circuit 101(1) are OFF, and the first bidirectional elements 13 and the second bidirectional elements 14 of the other (N−1) DC-DC converter circuits are all ON.

In the second time slot TS_2, only the first bidirectional element 13 and the second bidirectional element 14 of the second DC-DC converter circuit 101(2) are OFF, and the first bidirectional elements 13 and the second bidirectional elements 14 of the other (N−1) DC-DC converter circuits are all ON.

Similarly, in the N-th time slot TS_N, only the first bidirectional element 13 and the second bidirectional element 14 of the N-th DC-DC converter circuit 101(N) are OFF, and the first bidirectional elements 13 and the second bidirectional elements 14 of the other (N−1) DC-DC converter circuits are all ON.

In the present first embodiment, transformation ratios "V2/V1" of the DC-DC converter circuits 101(1) to 101(N) are all equal and are D/(1−D). Thus, a relationship between the input voltage "Vin" and the output voltage "Vo" of the power conversion device 100 that is constructed by connecting the N DC-DC converter circuits 101(1) to 101(N) is represented as follows.

$$V_o = N\frac{D}{1-D}V_{in} \quad \text{(Formula 1)}$$

As has been described above, the power conversion device 100 according to the present first embodiment includes a plurality of non-isolated DC-DC converter circuits 101 including bidirectional elements, the inputs of each DC-DC converter circuit 101 are connected in parallel, and the outputs of each DC-DC converter circuit 101 are connected in series.

As described earlier, in the case of a conventional power conversion device using an LLC resonant converter circuit, it is difficult for the LLC resonant converter circuit alone to perform control so as to keep an output voltage constant in a case where the output voltage ranges widely from a low output voltage to a high output voltage. For this reason, a constant-voltage circuit is generally provided upstream of an LLC resonant converter circuit. It is common to raise or lower a voltage in the LLC resonant converter circuit at a second stage after performing constant-voltage control in the constant-voltage circuit at a first stage.

In contrast, in the power conversion device 100 according to the present first embodiment, a plurality of non-isolated DC-DC converter circuits 101 having a combination of a constant-voltage control function and a voltage raising and lowering function are connected. With a simpler circuit configuration than in the related art, the power conversion device 100 can perform control such that the output voltage "V2" is kept constant in a case where the output voltage "V2" ranges widely from a low output voltage to a high output voltage. Since the power conversion device 100 can obtain the output voltage "V2" of arbitrary magnitude by adjusting the number of DC-DC converter circuits 101, the power conversion device 100 is excellent in scalability.

In the power conversion device 100 according to the present first embodiment, a high transformation ratio is achieved not by a single DC-DC converter circuit but by connection of a plurality of DC-DC converter circuits 101. For this reason, a transformation ratio of each DC-DC converter circuit 101 may be low. Appropriate adjustment of the number N of DC-DC converter circuits 101 makes it possible to set the duty ratio "D" of each DC-DC converter circuit 101 to close to 0.5 and leave a sufficient margin in on/off times in PWM control by each DC-DC converter circuit 101. Thus, the switching frequency "fsw" is easier to increase, and the first inductor L1 of relatively small size will do.

On/off operation of the non-isolated DC-DC converter circuit 101 according to the present first embodiment can be controlled by the same PWM control as in a common step-down and -up chopper circuit. For example, parts, such as a transformer and a snubber, needed in a conventional non-isolated flyback circuit are unnecessary. This makes design and control extremely easy.

The non-isolated DC-DC converter circuit 101 according to the present first embodiment includes the first bidirectional element 13 and the second bidirectional element 14. The first bidirectional element 13 is composed of the two semiconductor switching elements M1 and M2. The second bidirectional element 14 is composed of the two semiconductor switching elements M3 and M4. When the DC-DC converter circuit 101 is in an OFF state, an input potential and an output potential are electrically separated due to a drain-to-source parasitic capacitance of each semiconductor switching element.

In contrast, in a conventional LLC resonant converter circuit, an input potential and an output potential in an ON state and in an OFF state are electrically separated by a high-frequency transformer. The high-frequency transformer is a part which covers a large area on a circuit and can cause increase in the number of man-hours required for circuit design. Since the non-isolated DC-DC converter circuit 101 according to the present first embodiment need not use a high-frequency transformer, reduction in circuit area and reduction in the number of man-hours required for design can be expected.

Second Embodiment

Figure 5:
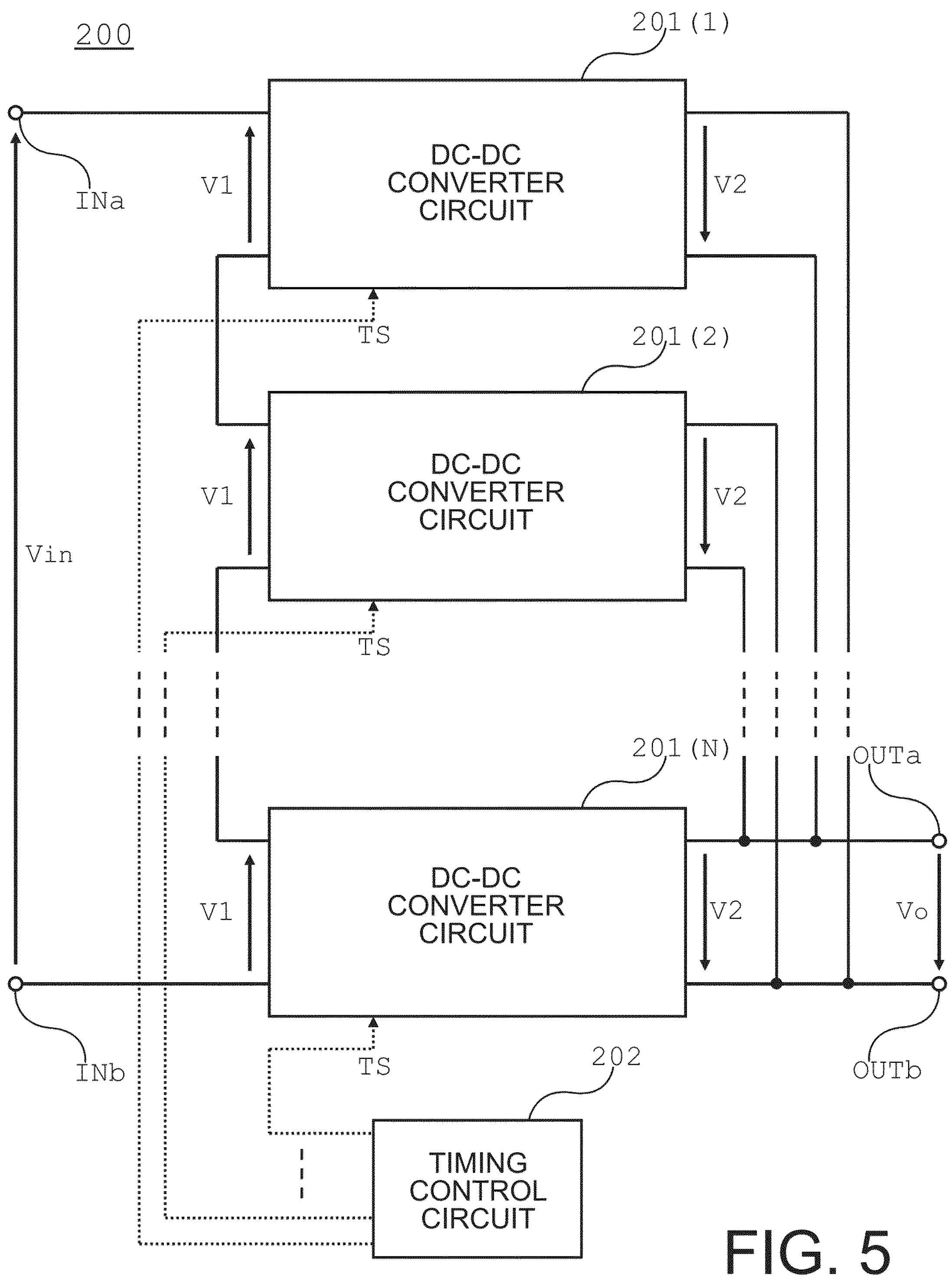
FIG. 5 is a diagram showing a configuration of a power conversion device according to a second embodiment.

FIG. 5 is a diagram showing a configuration of a power conversion device 200 according to a second embodiment. The power conversion device 200 is a device which lowers a DC input voltage to output a fixed DC voltage. A DC input voltage "Vin" is applied to input terminals INa and INb, and a DC output voltage "Vo" (<Vin) is output from output terminals OUTa and OUTb.

The power conversion device 200 includes N non-isolated DC-DC converter circuits 201(1) to 201(N) having identical configurations to those in the above-described first embodiment. The power conversion device 200 also includes a timing control circuit 202 which controls operation timings of the N DC-DC converter circuits 201(1) to 201(N).

Inputs of each of the DC-DC converter circuits 201(1) to 201(N) are connected in series, one input of the DC-DC converter circuit 201(1) at a top stage is connected to the input terminal INa, and the other input of the DC-DC converter circuit 201(N) at a bottom stage is connected to the input terminal INb. Input voltages "V1" of the DC-DC converter circuits 201(1) to 201(N) are all equal, and thus V1=Vin/N.

Outputs of each of the DC-DC converter circuits 201(1) to 201(N) are connected in parallel, one is connected to the output terminal OUTa, and the other is connected to the output terminal OUTb. Output voltages "V2" of the DC-DC converter circuits 201(1) to 201(N) are all equal, and V2=Vo.

Figure 6:
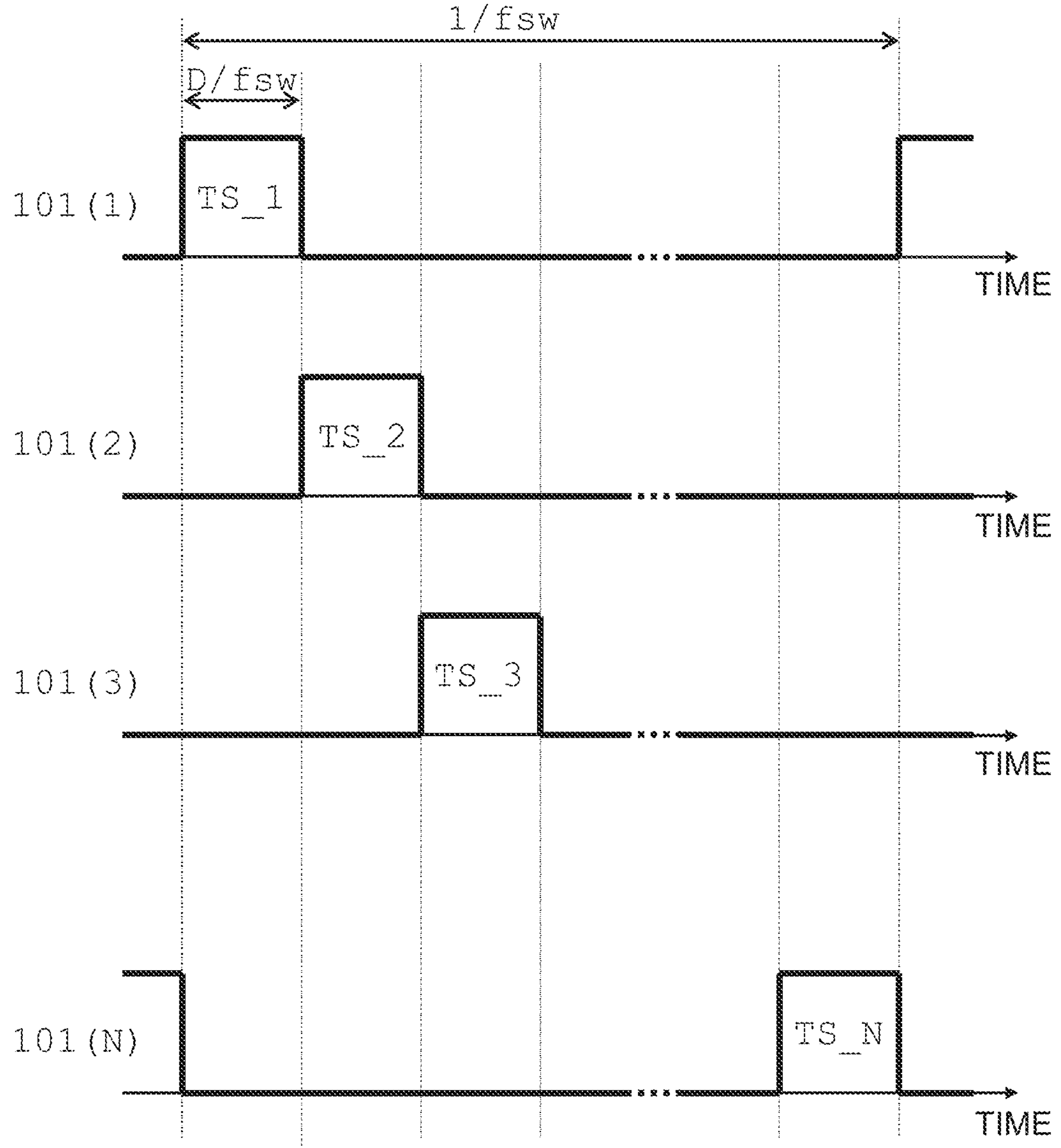
FIG. 6 is a chart showing respective ON/OFF operation timings of N non-isolated DC-DC converter circuits according to the second embodiment.

FIG. 6 is a chart showing respective ON/OFF operation timings of the N non-isolated DC-DC converter circuits 201(1) to 201(N) according to the present second embodiment. The timing control circuit 202 controls operation of the N DC-DC converter circuits 201(1) to 201(N) by repeating N time slots TS_1 to TS_N.

In the first time slot TS_1, only a first bidirectional element 13 and a second bidirectional element 14 of the first DC-DC converter circuit 201(1) are ON, and the first bidirectional elements 13 and the second bidirectional elements 14 of the other (N−1) DC-DC converter circuits are all OFF.

In the second time slot TS_2, only the first bidirectional element 13 and the second bidirectional element 14 of the second DC-DC converter circuit 201(2) are ON, and the first bidirectional elements 13 and the second bidirectional elements 14 of the other (N−1) DC-DC converter circuits are all OFF.

Similarly, in the N-th time slot TS_N, only the first bidirectional element 13 and the second bidirectional element 14 of the N-th DC-DC converter circuit 201(N) are ON, and the first bidirectional elements 13 and the second bidirectional elements 14 of the other (N−1) DC-DC converter circuits are all OFF.

In the present second embodiment, transformation ratios "V2/V1" of the DC-DC converter circuits 201(1) to 201(N) are all equal and are D/(1−D). In this case, a relationship between the input voltage "Vin" and the output voltage "Vo" of the power conversion device 200 that is constructed by connecting the N DC-DC converter circuits 201(1) to 201(N) is represented as follows.

$$V_o = \frac{1}{N}\frac{D}{1-D}V_{in} \quad \text{(Formula 2)}$$

As has been described above, the power conversion device 200 according to the present second embodiment includes a plurality of non-isolated DC-DC converter circuits 201 including bidirectional elements, inputs of each DC-DC converter circuit 201 are connected in series, and outputs of each DC-DC converter circuit 201 are connected in parallel. With this configuration, the power conversion device 200 according to the present second embodiment can obtain the same effects as in the above-described first embodiment.

Third Embodiment

Figure 7:
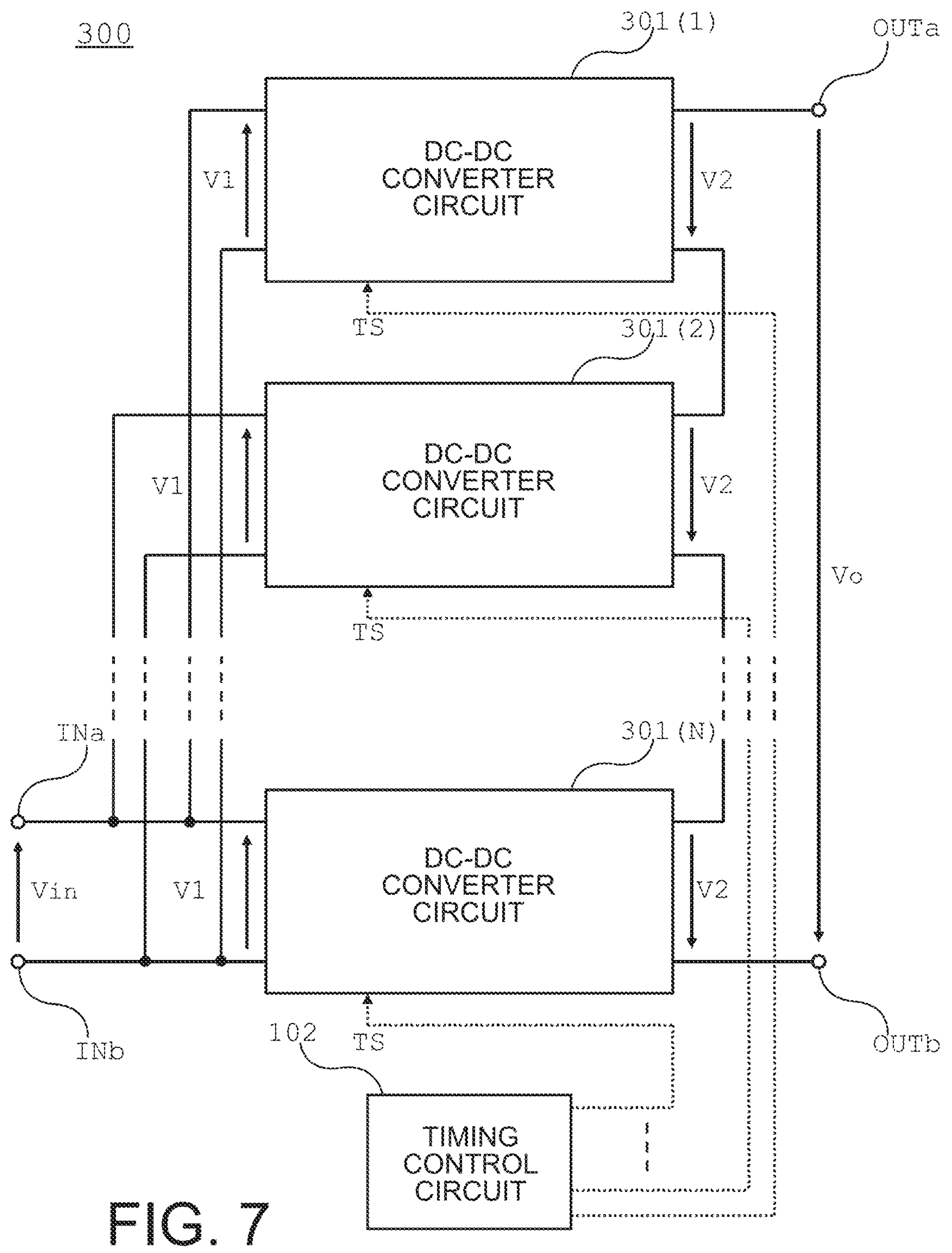
FIG. 7 is a diagram showing a configuration of a power conversion device according to a third embodiment.

FIG. 7 is a diagram showing a configuration of a power conversion device 300 according to a third embodiment. The power conversion device 300 is obtained by replacing the N non-isolated DC-DC converter circuits 101(1) to 101(N) with N non-isolated DC-DC converter circuits 301(1) to 301(N) in the power conversion device 100 according to the above-described first embodiment. The power conversion device 300 raises a DC input voltage to output a fixed DC voltage. Respective on/off operation timings of the DC-DC converter circuits 301(1) to 301(N) are the same as in the first embodiment.

Figure 8:
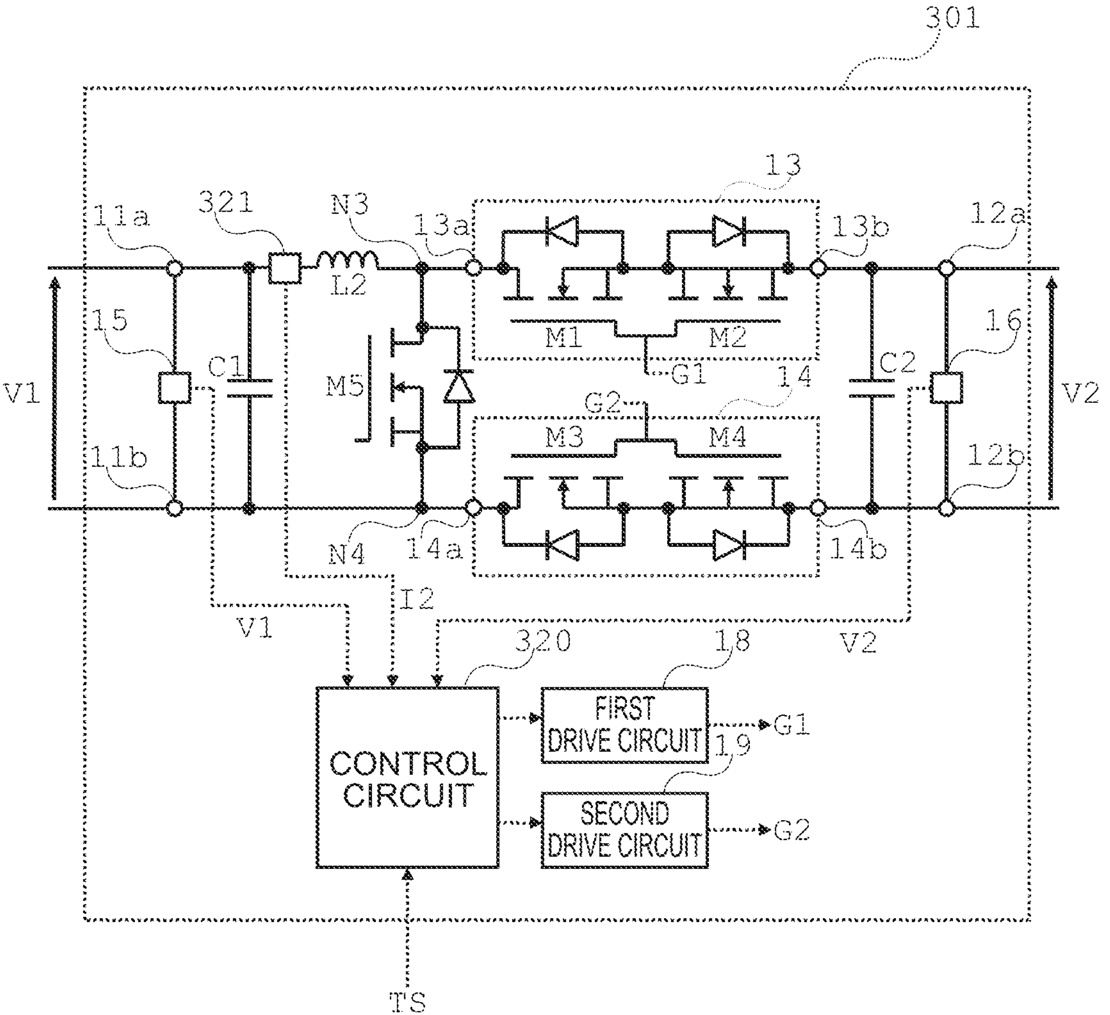
FIG. 8 is a diagram showing a detailed configuration of a non-isolated DC-DC converter circuit according to the third embodiment.

FIG. 8 is a diagram showing a detailed configuration of a non-isolated DC-DC converter circuit 301 according to the present third embodiment. Note that configurations of the DC-DC converter circuits 301(1) to 301(N) are all identical and that the DC-DC converter circuits 301(1) to 301(N) are collectively denoted as the DC-DC converter circuits 301.

The DC-DC converter circuit 301 includes a first bidirectional element 13 which is provided between a first input terminal 11*a* and a first output terminal 12*a* and a second bidirectional element 14 which is provided between a second input terminal 11*b* and a second output terminal 12*b*.

The DC-DC converter circuit 301 also includes a second inductor L2, a second current sensor 321, and a semiconductor switching element M5. The second inductor L2 is connected between the first input terminal 11*a* and the first bidirectional element 13. The second current sensor 321 detects a second current "I2" which flows through the second inductor L2.

As the semiconductor switching element M5, for example, an N-channel MOSFET can be used. In this case, a drain terminal of the semiconductor switching element M5 is connected to a third node N3 between the second inductor L2 and the first bidirectional element 13, and a source terminal of the semiconductor switching element M5 is connected to a fourth node N4 between the second input terminal 11*b* and the second bidirectional element 14.

A control circuit 320 controls operation of a first drive circuit 18 and a second drive circuit 19 on the basis of a timing control signal TS which is input from a timing control circuit 102, an input voltage "V1" and an output voltage "V2," and the second current "I2."

In the present third embodiment, transformation ratios "V2/V1" of the DC-DC converter circuits 301(1) to 301(N) are all equal and are 1/(1−D). Thus, V2>V1 always holds. A relationship between an input voltage "Vin" and an output voltage "Vo" of the power conversion device 300 is represented as follows.

$$V_o = N\frac{1}{1-D}V_{in} \geq \left(\frac{1}{1-D_{min}}\right)^2 V_{in} \quad \text{(Formula 3)}$$

$$D \geq 1 - \frac{1}{N} \; N \geq \frac{1}{1-D_{min}}$$

Fourth Embodiment

Figure 9:
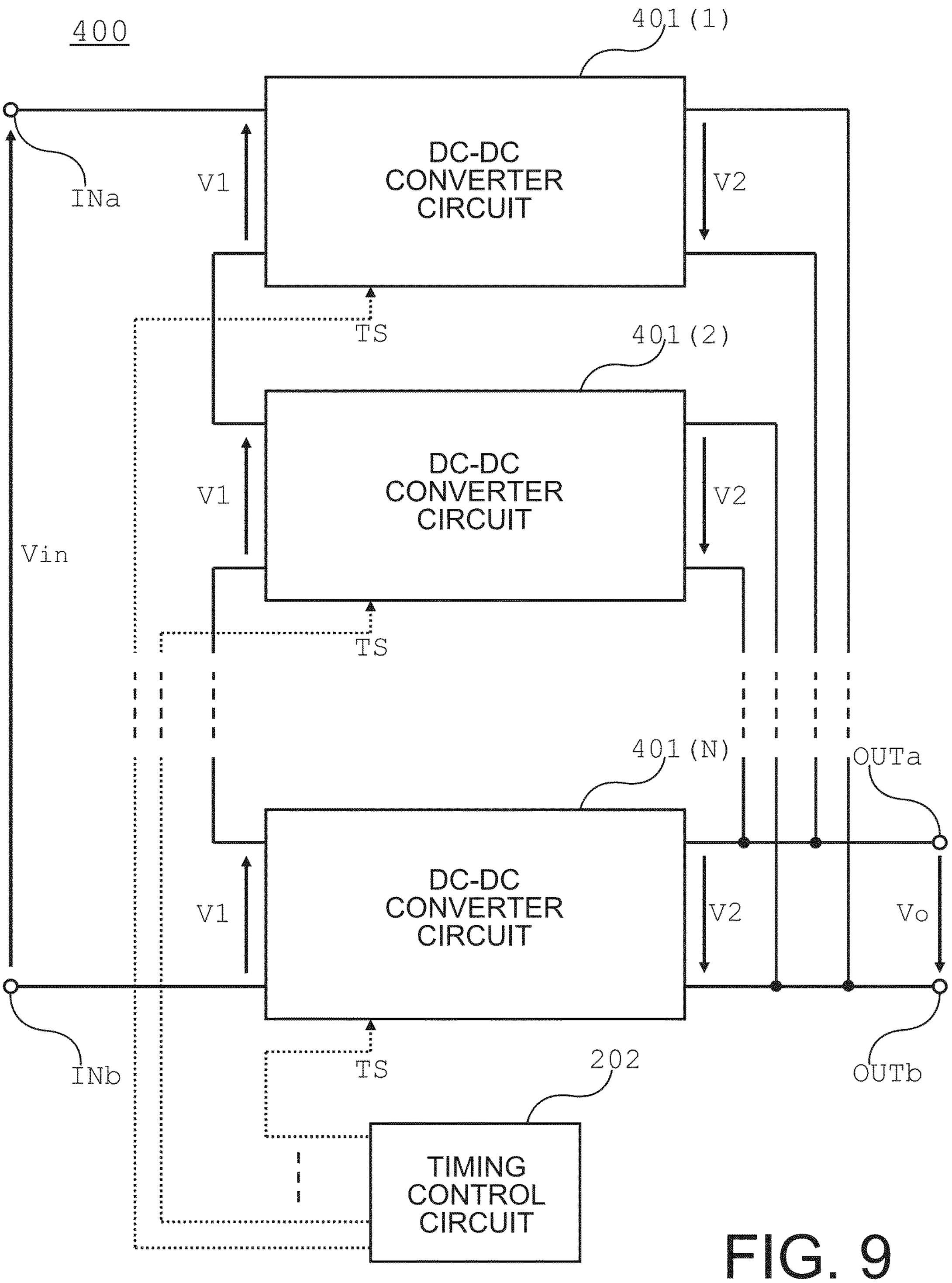
FIG. 9 is a diagram showing a configuration of a power conversion device according to a fourth embodiment.

FIG. 9 is a diagram showing a configuration of a power conversion device 400 according to a fourth embodiment. The power conversion device 400 is obtained by replacing the N non-isolated DC-DC converter circuits 201(1) to 201(N) with N non-isolated DC-DC converter circuits 401(1) to 401(N) in the power conversion device 200 according to the above-described second embodiment. The power conversion device 400 lowers a DC input voltage to output a fixed DC voltage. Respective on/off operation timings of the DC-DC converter circuits 401(1) to 401(N) are the same as in the second embodiment.

Figure 10:
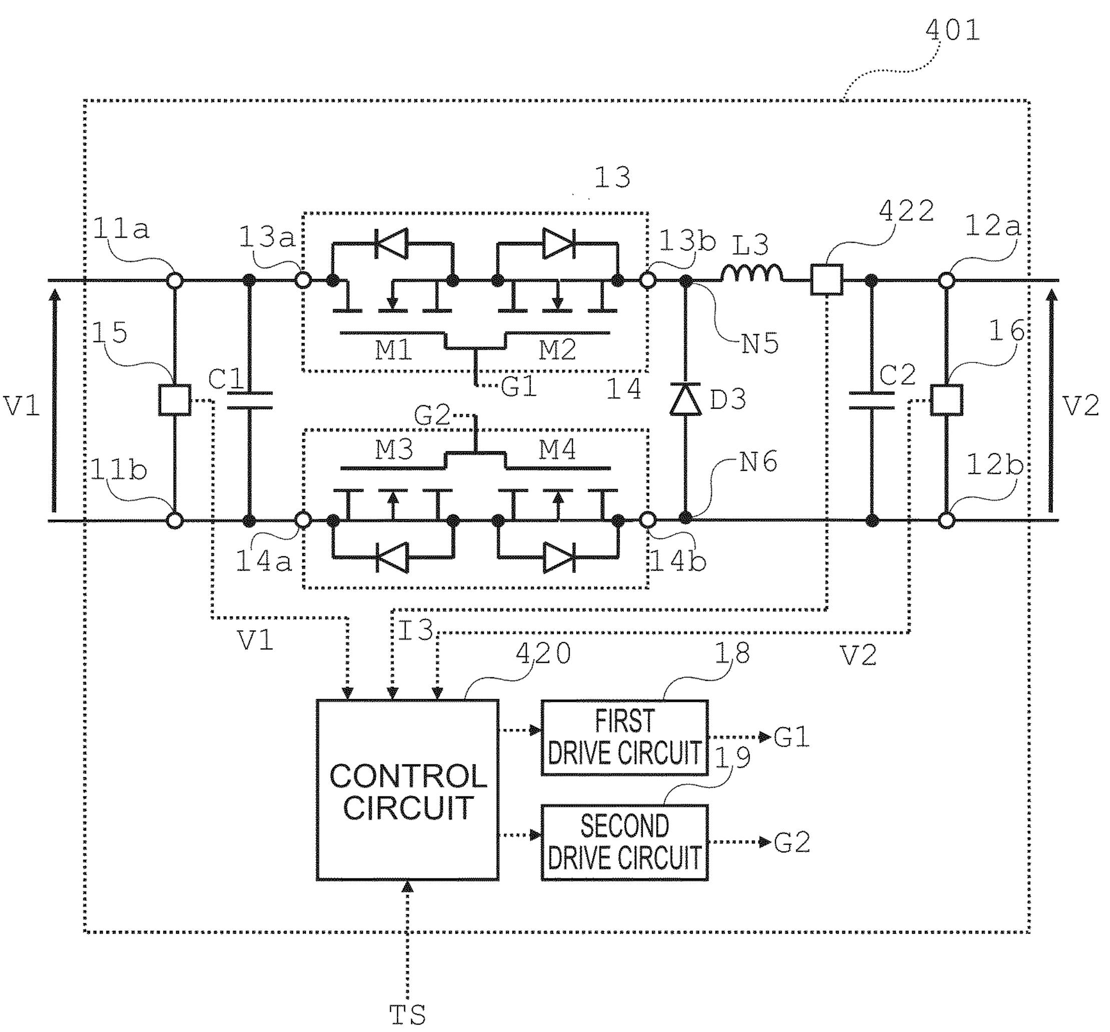
FIG. 10 is a diagram showing a detailed configuration of a non-isolated DC-DC converter circuit according to the fourth embodiment.

FIG. 10 is a diagram showing a detailed configuration of a non-isolated DC-DC converter circuit 401 according to the present fourth embodiment. Note that configurations of the DC-DC converter circuits 401(1) to 401(N) are all identical and that the DC-DC converter circuits 401(1) to 401(N) are collectively denoted as the DC-DC converter circuits 401.

The DC-DC converter circuit 401 includes a first bidirectional element 13 which is provided between a first input terminal 11*a* and a first output terminal 12*a* and a second bidirectional element 14 which is provided between a second input terminal 11*b* and a second output terminal 12*b*.

The DC-DC converter circuit 401 also includes a third inductor L3, a third current sensor 422, and a third unidirectional element D3. The third inductor L3 is connected between the first bidirectional element 13 and the first output terminal 12*a*. The third current sensor 422 detects a third current "I3" which flows through the third inductor L3.

As the third unidirectional element D3, for example, a semiconductor diode can be used. In this case, a cathode of the third unidirectional element D3 is connected to a fifth node N5 between the first bidirectional element 13 and the third inductor L3, and an anode of the third unidirectional element D3 is connected to a sixth node N6 between the second bidirectional element 14 and the second output terminal 12*b*.

A control circuit 420 controls operation of a first drive circuit 18 and a second drive circuit 19 on the basis of a timing control signal TS which is input from a timing control circuit 202, an input voltage "V1" and an output voltage "V2," and the third current "I3."

In the present fourth embodiment, transformation ratios "V2/V1" of the DC-DC converter circuits 401(1) to 401(N) are all equal and are D. Thus, V2<V1 always holds. A relationship between an input voltage "Vin" and an output voltage "Vo" of the power conversion device 400 is represented as follows.

$$V_o = \frac{1}{N} D V_{in} \leq D_{max}^2 V_{in} \quad \text{(Formula 4)}$$

$$D \leq \frac{1}{N} \; D_{max}^2 \geq \frac{1}{N}$$

(Modifications)

In the above-described first to fourth embodiments, an N-channel MOSFET is used as each of the semiconductor switching elements M1 to M5. Instead of this, a P-channel MOSFET may be used as each of the semiconductor switching elements M1 to M5.

In the first to fourth embodiments, a semiconductor diode is used as each of the unidirectional elements D1 to D3. Synchronous rectification may be performed by using a semiconductor switching element, such as a MOSFET, as each of the unidirectional elements D1 to D3 instead of this. Alternatively, a component like the bidirectional element 13 or 14 in which two semiconductor switching elements are connected may be used as each of the unidirectional elements D1 to D3. With these configurations, heat generation in the unidirectional elements D1 to D3 can be suppressed.

A semiconductor switching element is not limited to a MOSFET. For example, an IGBT (Insulated Gate Bipolar Transistor), a BIT (Bipolar Junction Transistor), or the like may be used as a semiconductor switching element. As semiconductors of which a semiconductor switching element and a semiconductor diode are made, various materials, such as Si (Silicon), SiC (Silicon Carbide), or GaN (Gallium Nitride), can be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described before may be configured as below.

(Clauses)

Clause 1. A power conversion device comprising
- a plurality of non-isolated DC-DC converter circuits each including a bidirectional element,
- wherein inputs of the plurality of non-isolated DC-DC converter circuits are connected in parallel, and outputs of the plurality of non-isolated DC-DC converter circuits are connected in series.

Clause 2. The power conversion device according to clause 1, wherein
- each of the plurality of non-isolated DC-DC converter circuits further includes
  - a first input terminal and a second input terminal, and
  - a first output terminal and a second output terminal,
- wherein the bidirectional element in each of the plurality of non-isolated DC-DC converter includes
  - a first bidirectional element which is provided between the first input terminal and the first output terminal, and
  - a second bidirectional element which is provided between the second input terminal and the second output terminal.

Clause 3. The power conversion device according to clause 2, wherein
- each of the first bidirectional element and the second bidirectional element includes a first semiconductor switching element and a second semiconductor switching element, and
- respective first terminals of the first semiconductor switching element and the second semiconductor switching element are connected together, and respective control terminals of the first semiconductor switching element and the second semiconductor switching element are connected together.

Clause 4. The power conversion device according to clause 2 or 3, wherein
- each of the plurality of non-isolated DC-DC converter circuits further includes
  - a first inductor which has one end connected to a first node between the first bidirectional element and the first output terminal and the other end connected to a second node between the second bidirectional element and the second output terminal.

Clause 5. The power conversion device according to clause 4, wherein
- each of the plurality of non-isolated DC-DC converter circuits further includes
  - a first unidirectional element which has one terminal connected to the first output terminal and the other terminal connected to the first node, and
  - a second unidirectional element which has one end connected to the second node and the other terminal connected to the second output terminal.

Clause 6. The power conversion device according to any one of clauses 2 to 5, wherein
- each of the plurality of non-isolated DC-DC converter circuits further includes
  - a first drive circuit configured to supply a first PWM control signal to the first bidirectional element,
  - a second drive circuit configured to supply a second PWM control signal to the second bidirectional element, and
  - a control circuit configured to control operation of the first drive circuit and the second drive circuit.

Clause 7. The power conversion device according to clause 6, wherein each of the plurality of non-isolated DC-DC converter circuits further includes a first voltage sensor configured to detect a first voltage between the first input terminal and the second input terminal, a second voltage sensor configured to detect a second voltage between the first output terminal and the second output terminal, and a first current sensor configured to detect a first current flowing through the first inductor, and the control circuit controls the operation of the first drive circuit and the second drive circuit on the basis of the first voltage and the second voltage, and the first current.

Clause 8. The power conversion device according to clause 7, further comprising a timing control circuit configured to control operation timings of the plurality of non-isolated DC-DC converter circuits by repeating N time slots, N being the number of the plurality of DC-DC converter circuits, wherein in a first time slot, only a first DC-DC converter circuit is OFF, and other (N−1) DC-DC converter circuits are all ON, in a second time slot, only a second DC-DC converter circuit is OFF, and other (N−1) DC-DC converter circuits are all ON, and in a subsequent time slot, control is performed in a same manner.

Clause 9. The power conversion device according to clause 2 or 3, wherein each of the plurality of non-isolated DC-DC converter circuits further includes a second inductor which is connected between the first input terminal and the first bidirectional element, and a third switching element which has one end connected to a third node between the second inductor and the first bidirectional element and the other end connected to a fourth node between the second input terminal and the second bidirectional element.

Clause 10. A power conversion device comprising a plurality of non-isolated DC-DC converter circuits each including a bidirectional element, wherein inputs of the plurality of non-isolated DC-DC converter circuits are connected in series, and outputs of the plurality of non-isolated DC-DC converter circuits are connected in parallel.

Clause 11. The power conversion device according to clause 10, wherein each of the plurality of non-isolated DC-DC converter circuits further includes a first input terminal and a second input terminal, and a first output terminal and a second output terminal, wherein the bidirectional element each of the plurality of non-isolated DC-DC converter includes a first bidirectional element which is provided between the first input terminal and the first output terminal, and a second bidirectional element which is provided between the second input terminal and the second output terminal.

Clause 12. The power conversion device according to clause 11, wherein each of the first bidirectional element and the second bidirectional element includes a first semiconductor switching element and a second semiconductor switching element, and respective first terminals of the first semiconductor switching element and the second semiconductor switching element are connected together, and respective control terminals of the first semiconductor switching element and the second semiconductor switching element are connected together.

Clause 13. The power conversion device according to clause 11 or 12, wherein each of the plurality of non-isolated DC-DC converter circuits further includes a first inductor which has one end connected to a first node between the first bidirectional element and the first output terminal and the other end connected to a second node between the second bidirectional element and the second output terminal.

Clause 14. The power conversion device according to clause 13, wherein each of the plurality of non-isolated DC-DC converter circuits further includes a first unidirectional element which has one terminal connected to the first output terminal and the other terminal connected to the first node, and a second unidirectional element which has one end connected to the second node and the other terminal connected to the second output terminal.

Clause 15. The power conversion device according to any one of clauses 11 to 14, wherein each of the plurality of non-isolated DC-DC converter circuits further includes a first drive circuit configured to supply a first PWM control signal to the first bidirectional element, a second drive circuit configured to supply a second PWM control signal to the second bidirectional element, and a control circuit configured to control operation of the first drive circuit and the second drive circuit.

Clause 16. The power conversion device according to clause 15, wherein each of the plurality of non-isolated DC-DC converter circuits further includes a first voltage sensor configured to detect a first voltage between the first input terminal and the second input terminal, a second voltage sensor configured to detect a second voltage between the first output terminal and the second output terminal, and a first current sensor configured to detect a first current flowing through the first inductor, and the control circuit controls the operation of the first drive circuit and the second drive circuit on the basis of the first voltage and the second voltage, and the first current.

Clause 17. The power conversion device according to clause 16, further comprising a timing control circuit configured to control operation timings of the plurality of non-isolated DC-DC converter circuits by repeating N time slots, N being the number of the plurality of DC-DC converter circuits, wherein in a first time slot, only a first DC-DC converter circuit is ON, and other (N−1) DC-DC converter circuits are all OFF, in a second time slot, only a second DC-DC converter circuit is ON, and other (N−1) DC-DC converter circuits are all OFF, and in a subsequent time slot, control is performed in a same manner.

Clause 18. The power conversion device according to clause 11 or 12, wherein each of the plurality of non-isolated DC-DC converter circuits further includes a third inductor which is connected between the first bidirectional element and the first output terminal, and a third unidirectional element which has one end connected to a fifth node between the first bidirectional element and the third inductor and the other end connected to a sixth node between the second bidirectional element and the second output terminal.

The invention claimed is:

1. A power conversion device comprising a plurality of non-isolated DC-DC converter circuits each including a bidirectional element, wherein inputs of the plurality of non-isolated DC-DC converter circuits are connected in parallel, and outputs of the plurality of non-isolated DC-DC converter circuits are connected in series, wherein each of the plurality of non-isolated DC-DC converter circuits further includes:

a first input terminal and a second input terminal;

a first output terminal and a second output terminal;

wherein the bidirectional element in each of the plurality of non-isolated DC-DC converter circuits includes:

a first bidirectional element which is provided between the first input terminal and the first output terminal; and a second bidirectional element which is provided between the second input terminal and the second output terminal; and wherein each of the plurality of non-isolated DC-DC converter circuits further includes:

a first inductor which has one end connected to a first node between the first bidirectional element and the first output terminal and the other end connected to a second node between the second bidirectional element and the second output terminal.

2. The power conversion device according to claim 1, wherein each of the first bidirectional element and the second bidirectional element includes a first semiconductor switching element and a second semiconductor switching element, and respective first terminals of the first semiconductor switching element and the second semiconductor switching element are connected together, and respective control terminals of the first semiconductor switching element and the second semiconductor switching element are connected together.

3. The power conversion device according to claim 1, wherein each of the plurality of non-isolated DC-DC converter circuits further includes a first unidirectional element which has one terminal connected to the first output terminal and the other terminal connected to the first node, and a second unidirectional element which has one end connected to the second node and the other terminal connected to the second output terminal.

4. The power conversion device according to claim 1, wherein each of the plurality of non-isolated DC-DC converter circuits further includes a first drive circuit configured to supply a first PWM control signal to the first bidirectional element, a second drive circuit configured to supply a second PWM control signal to the second bidirectional element, and a control circuit configured to control operation of the first drive circuit and the second drive circuit.

5. The power conversion device according to claim 4, wherein each of the plurality of non-isolated DC-DC converter circuits further includes a first voltage sensor configured to detect a first voltage between the first input terminal and the second input terminal, a second voltage sensor configured to detect a second voltage between the first output terminal and the second output terminal, and a first current sensor configured to detect a first current flowing through the first inductor, and the control circuit controls the operation of the first drive circuit and the second drive circuit on the basis of the first voltage and the second voltage, and the first current.

6. The power conversion device according to claim 5, further comprising a timing control circuit configured to control operation timings of the plurality of non-isolated DC-DC converter circuits by repeating N time slots, N being the number of the plurality of DC-DC converter circuits, wherein in a first time slot, only a first DC-DC converter circuit is OFF, and other (N−1) DC-DC converter circuits are all ON, in a second time slot, only a second DC-DC converter circuit is OFF, and other (N−1) DC-DC converter circuits are all ON, and in a subsequent time slot, control is performed in a same manner.

7. A power conversion device comprising:

a plurality of non-isolated DC-DC converter circuits each including a bidirectional element, wherein inputs of the plurality of non-isolated DC-DC converter circuits are connected in parallel, and outputs of the plurality of non-isolated DC-DC converter circuits are connected in series;

wherein each of the plurality of non-isolated DC-DC converter circuits further includes a first input terminal and a second input terminal;

a first output terminal and a second output terminal;

wherein the bidirectional element in each of the plurality of non-isolated DC-DC converter circuits includes:

a first bidirectional element which is provided between the first input terminal and the first output terminal; and a second bidirectional element which is provided between the second input terminal and the second output terminal; and wherein each of the plurality of non-isolated DC-DC converter circuits further includes:

a second inductor which is connected between the first input terminal and the first bidirectional element, and a third switching element which has one end connected to a third node between the second inductor and the first bidirectional element and the other end connected to a fourth node between the second input terminal and the second bidirectional element.

* * * * *